United States Patent [19]
Ise

[11] Patent Number: 5,463,496
[45] Date of Patent: Oct. 31, 1995

[54] IMAGE PICKUP OPTICAL SYSTEM WHICH MINIMIZES THE EFFECTS OF SPURIOUS SIGNALS

[75] Inventor: Koichi Ise, Chiba, Japan

[73] Assignee: Sony Corporation, Tokyo, Japan

[21] Appl. No.: 209,714

[22] Filed: Mar. 14, 1994

[30] Foreign Application Priority Data

Mar. 30, 1993 [JP] Japan ................... 5-093855

[51] Int. Cl.$^6$ ............................ G02B 3/02; G02B 13/18; G02B 9/14
[52] U.S. Cl. ................. 359/497; 359/499; 359/708; 359/785
[58] Field of Search ............................ 359/497, 498, 359/563, 708, 723, 499

[56] References Cited

U.S. PATENT DOCUMENTS

| | | | |
|---|---|---|---|
| 4,566,762 | 1/1986 | Kato | 359/497 |
| 4,760,839 | 8/1988 | Nagasaki | 359/498 |
| 4,930,861 | 6/1990 | Okabe et al. | 359/785 |
| 5,052,791 | 10/1991 | Kikochi | 359/497 |
| 5,233,431 | 8/1993 | Yoshida et al. | 359/723 |
| 5,237,446 | 8/1993 | Takahashi | 359/583 |
| 5,270,825 | 12/1993 | Takasugi et al. | 359/708 |
| 5,309,239 | 5/1994 | Bouwhuis | 359/563 |

FOREIGN PATENT DOCUMENTS 57-39683  4/1982  Japan .

OTHER PUBLICATIONS

Patent Abstract of Japan, vol. 15, No. 254.
Patent Abstract of Japan, vol. 10 No. 129.
Patent Abstract of Japan, vol. 13, No. 342.

*Primary Examiner*—Martin Lerner
*Attorney, Agent, or Firm*—Ronald P. Kananen

[57] ABSTRACT

An image pickup optical system having an image pickup lens system having in turn a plurality of lenses arranged in multiple stages for forming an image of an object on an image plane of an image pickup device is disclosed. The image pickup optical system includes a double refraction plate arranged downstream of the image pickup lens system, a diaphragm unit, as a first optical unit, for determining the F-number of the image pickup lens system by a diaphragm aperture, and a second optical unit. When the F-number is equal to a pre-set value Fd or less, the second optical unit operates in conjunction with the double refraction plate for lowering the modulation transfer function (MTF) by the aberration due to an aspherical surface for a range of the spatial frequency not less than the cut-off frequency $r_c$. Sufficient spurious signal suppressive effects may be obtained even if the optical low-pass filter is constituted by a sole double refraction plate, such as a quartz plate.

7 Claims, 13 Drawing Sheets

IMAGE PICKUP OPTICAL SYSTEM WHICH MINIMIZES THE EFFECTS OF SPURIOUS SIGNALS

FIELD OF THE INVENTION

This invention relates to an image pickup optical system employed in an image pickup device, such as a video camera. More particularly, it relates to an image pickup device for forming an image of an object on an image pickup surface of an image pickup device.

BACKGROUND OF THE INVENTION

In general, in a solid-state image pickup device having a discrete pixel structure, or an image pickup optical system having an image tube, in turn, having a color separation filter, an image of an object is processed with optical spatial sampling for generating an image output.

The degree of fineness of a picture pattern that can be handled by such image pickup optical system is determined in connection with the sampling frequency and, if spatial frequency components higher than the sampling frequency are contained in the picture pattern, spurious signals known as moire or aliasing tend to be produced. For this reason, it becomes necessary to arrange an optical low-pass filter for limiting the high spatial frequency components of the object in the image pickup optical system.

As such optical low-pass filter, an optical low-pass filter taking advantage of double refraction of a quartz plate has been employed. The optical low-pass filter by the quartz plate affords optical blur by double refraction proper to the quartz plate for reducing high spatial frequency components of the object image for suppressing spurious signals.

As an example of the optical low-pass filter employing such quartz plate, there is known an optical low-pass filter employing three quartz plates, as proposed by JP Patent Kokai Publication No. 57-39683 (1982).

The MTF—spatial frequency characteristics of an optical low-pass filter employing three quartz plates and an optical low-pass filter employing a sole low-pass filter are explained in connection with FIGS. 1 and 2. The optical low-pass filter employing three quartz plates are low in MTF values for a frequency not less than the cut-off frequency of 80 lp/mm, as shown in FIG. 1, such that it has sufficient spurious signal inhibiting effects. Conversely, the optical low-pass filter employing a sole low-pass filter has larger MTF values for a frequency not less than the cut-off frequency of 80 lp/mm, as shown in FIG. 2, such that it has only poor effects in inhibiting spurious signals.

Consequently, the conventional practice has been to arrange the optical low-pass filter with three or more quartz plates to suppress the MTF for the frequency higher than the cut-off frequency.

However, since the optical low-pass filter in the conventional image pickup optical system is constituted by three or more quartz plates, the following problems arise.

That is, quartz crystal growth in general involves a lot of time and hence quartz is rather costly. Besides, since as many as three or more of the costly quartz plates are used, the image pickup optical system and hence the image pickup apparatus employing the image pickup optical system becomes expensive. In addition, since three or more quartz plates are bonded together to fabricate the optical low-pass filter, the operation of positioning the quartz plates being bonded together becomes troublesome to give rise to a complicated manufacture process and an increased number of process steps.

OBJECTS AND SUMMARY OF THE INVENTION

Its is an object of the present invention to provide an image pickup optical system wherein sufficient spurious signal inhibitive effects may be exhibited even although the number of double refraction plates such as quartz plates constituting the optical low-pass filter is reduced.

It is another object of the present invention to provide an image pickup optical system wherein the number of double refraction plates making up the optical low-pass filter may be reduced to facilitate the assembling and manufacture of the image pickup optical system.

In accordance with the present invention, there is provided an image pickup optical system having an image pickup lens system having a plurality of lenses arranged in multiple stages for forming an image of an object on an image plane of an image pickup device. The image pickup optical system includes a double refraction plate arranged downstream of the image pickup lens system, a first optical unit for determining the F-number of the image pickup lens system by a diaphragm aperture, and a second optical unit. When the F-number is not less than a pre-set value, the first optical unit is operated in conjunction with the double refraction plate for lowering the modulation transfer function (MTF) for a range of the spatial frequency not less than the spatial frequency which is prone to spurious signals. On the other hand, when the F-number is not more than the pre-set value, the second optical unit is operated in conjunction with the double refraction plate for lowering the modulation transfer function for a range of the spatial frequency not less than the spatial frequency which is prone to spurious signals.

With the image pickup optical system according to the present invention, the relation $MTF(2r_c) \leq 0.4$ is designed to be satisfied for the totality of the values of the F-number in excess of the F-number value corresponding to the complete opening of a diaphragm in the first optical means, with $MTF(2r_c)$ being an MTF value on the optical axis in the image plane when the image pickup lens system is combined with the double refraction plate, or an MTF value at a spatial frequency $2r_c$, $r_c$ being a cut-off frequency by the double refraction plate.

Specifically, $MTF(2r_c)$ is an absolute value of the optical transfer function $OTF(r)$, which is an OTF value for the white light, shown by the equation (1):

$$OTF(r) = \int W(\lambda) \, OTF\{\lambda(r)\} \, d\lambda \tag{1}$$

obtained by integrating $OTF\{\lambda(r)\}$ for the monochromatic light in the visible range, weighted by a weight $W(\lambda) = T(\lambda) S(\lambda)$, with respect to the wavelength $\lambda$, where $T(\lambda)$ and $S(\lambda)$ are a spectral transmission factor and sensitivity characteristic of the image pickup device, respectively. Similarly, it is an MTF value at a spatial frequency $2r_c$, $r_c$ being a cut-off frequency by the double refraction plate.

The MTF value by the equation (1) may be found by an absolute value having approximation on the order of five wavelengths.

In the above constitution, the relation $$\frac{MTF_{MAX}(r_c/2) - MTF_{MIN}(r_c/2)}{MTF_{MAX}(r_c/2)} \leq 0.3 \quad (2)$$

may be designed to be satisfied, wherein $MTF_{MAX}(r_c/2)$ and $MTF_{MIN}(r_c/2)$ are a maximum value and a minimum value, respectively, of the MTF at the spatial frequency $r_c/2$ when the aperture of the first optical means is changed from the fully opened diaphragm to the preset value Fd of the F-number, with the pre-set value of the F-number being an MTF value which prevails when assumed that the image pickup lens system is free of aberration and only the diffraction at the aperture of the diaphragm in the first optical means contributes to MTF, or a value of the F-number which prevails when the value of the MTF for a spatial frequency $2r_c$ is 0.4, with $r_c$ being the cut-off frequency by the double refraction plate.

The spherical aberration of the image pickup lens system for an e-ray has at least one extreme value for a region of the F-number larger than the pre-set value Fd.

The aspherical surface in the second optical means is simultaneously used for correcting the aberration.

As compared to the optical low-pass filter comprising three quartz plates bonded together, the optical low-pass filter comprising a sole quartz plate having the cut-off frequency $r_c$ has an MTF value for a spatial frequency higher than the cut-off frequency $r_c$ and is insufficient in suppressing spurious signals.

However, with the present invention, when the diaphragm of the aperture of the first optical means 3 determining the value of the F-number by the aperture stop is diminished to more than a certain extent, the aberration of the image pickup lens system becomes negligibly small, so that the characteristics of the image pickup lens system is governed by the phenomenon of diffraction at the aperture now reduced in size. Consequently, the larger becomes the value of the F-number of the image pickup lens system, as a result of the operation of the first optical means, the smaller becomes the MTF by such phenomenon of diffraction.

Consequently, with the image pickup optical system according to the present invention, the MTF is lowered for the spatial frequency larger than the cut-off frequency $r_c$ by the combination of the diffraction by the first optical means and the function of the optical low-pass filter or the operation of double refraction by the double refraction plate.

On the other hand, if the value of the F-number of the image pickup lens system becomes smaller, the MTF for the spatial frequency higher than the cut-off frequency $r_c$ is gradually increased for lowering spurious signal suppressive effects. However, with the present invention, an aspheric surface is introduced into the image pickup lens system for positively generating the spherical aberration for lowering the MTF at the high spatial frequency.

Consequently, with the image pickup optical system according to the present invention, the MTF for the spatial frequency higher than the cut-off frequency $r_c$ is lowered by the combination of the aberration by the aspherical surface of the second optical means and the optical low-pass filter function which is the birefringent action by the double refraction plate.

It is seen from above that, with the image pickup optical system according to the present invention, the spurious signal suppressive effects substantially similar to those of the conventional optical low-pass filter comprising three quartz plates may be achieved with the use of the sole quartz plate with the result that the number of the double refraction plates may be diminished to contribute to reduction of production costs. Since the sole quartz plate is employed, the production process involving a troublesome operation, such as bonding, may be eliminated to improve mass-producibility of the image pickup optical system.

In particular, the aspherical surface of the second optical means may be used simultaneously for correction of the aberration for reducing the number of the aspherical surfaces and hence production costs. The fact that the number of aspherical surfaces may be diminished occasionally means that a single aspherical side lens may be used in place of a double aspherical side lens, so that the production process may be simplified such as facilitated optical axis matching.

BRIEF DESCRIPTION OF THE DRAWINGS

FIG. 3A and 3B illustrate a first embodiment of an image-pickup optical system according to the present invention, wherein FIG. 3A shows an arrangement in which the zooming position of the image pickup lens system is at a wide-end, and FIG. 3 shows an arrangement in which the zooming position of the image pickup lens system is at a tele-end.

DETAILED DESCRIPTION OF THE PREFERRED EMBODIMENTS

Figure 1:
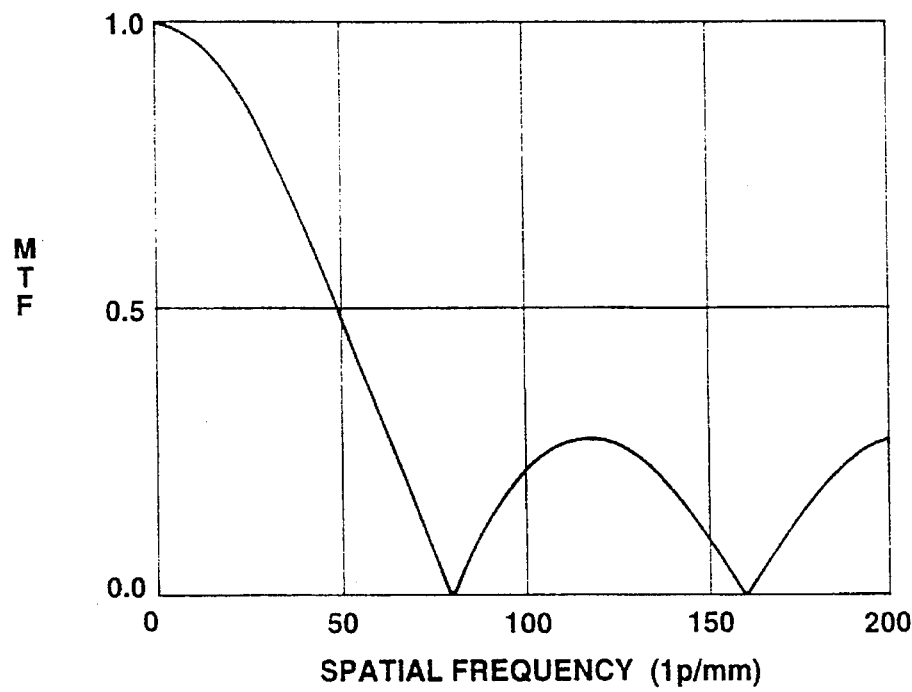
FIG. 1 is a graph showing MTF—spatial frequency characteristics of a conventional optical low-pass filter employing three quartz plates.

Referring to FIGS. 3 to 22, two preferred embodiments of an image pickup optical system according to the present invention will be explained. In these embodiments, a CCD solid-state image pickup device is employed as an image pickup device.

The image pickup optical system according to the first embodiment is made up of an image pickup lens system 5, plane parallel plates 6 and a CCD sensor 7, arrayed in this order on an optical axis, as shown in FIG. 3. The lens system 5 is made up of a front lens unit 1, a zoom lens unit 2, a diaphragm unit 3 and an inner focus unit 4, comprised of fixed and movable lenses, while the plane parallel plates 6 are made up an IR absorptive glass, a cover glass for the CCD solid-state image pickup device and a double refraction plate comprised of a sole quartz plate.

The front lens unit 1 constitutes first to fifth surfaces of the image pickup lens system, while the diaphragm unit 3 and the inner focus unit 4 constitute the 11th surface and the 12th to 16th surfaces of the optical image pickup device, respectively. The plane parallel plates 6, made up of the IR absorptive glass cover glass and the sole double refraction plate or quartz plate, constitute the 17th and 18th surfaces of the image pickup optical system.

Figures 3A, 3B:
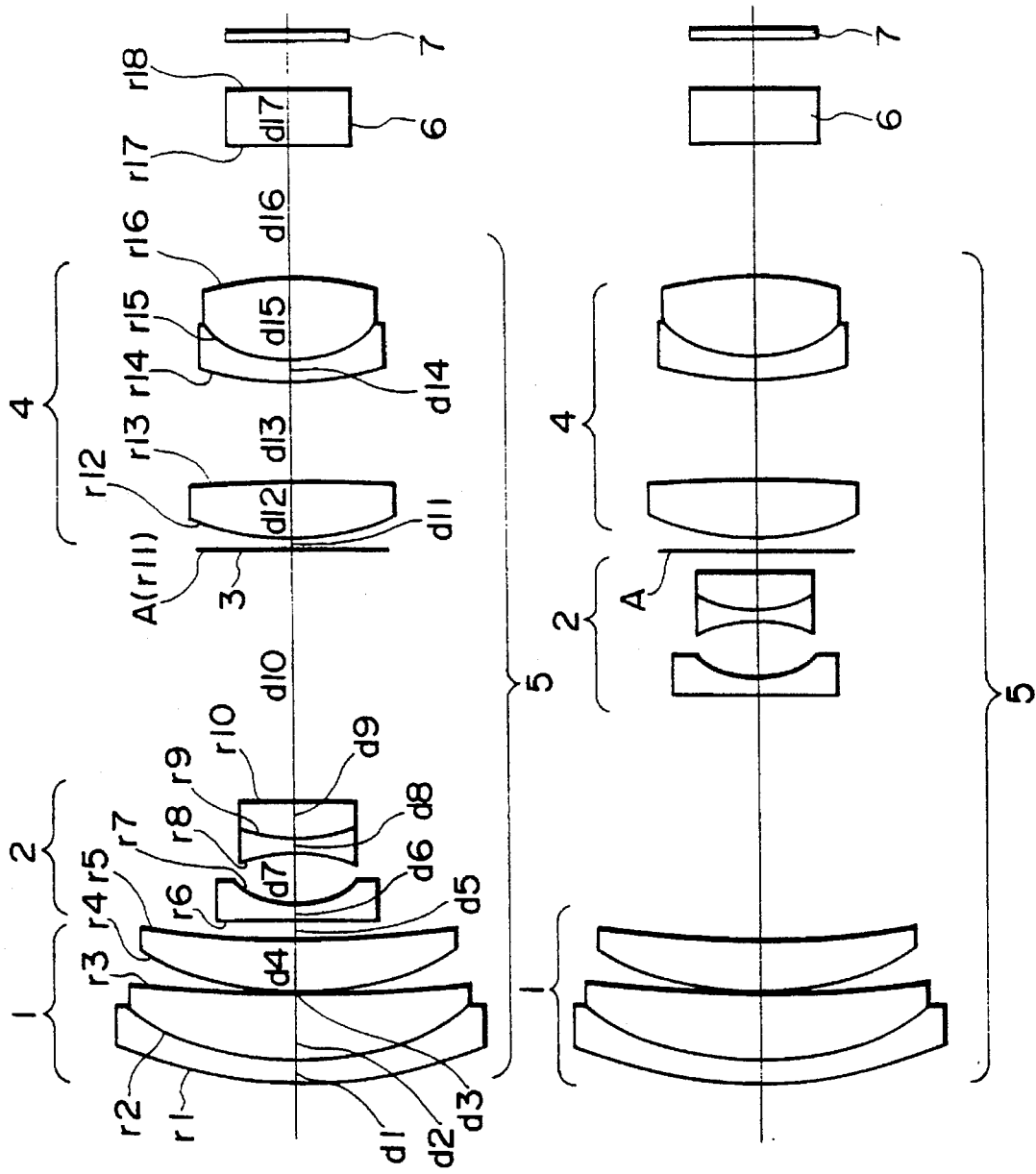

FIGS. 3A and 3B show the state in which the zoom lens unit 2 is closest to the front lens unit 1, that is the zoom position of the image pickup lens system 5 is at the wide-end, and the state in which the zoom lens unit 2 is furthest from the front lens unit 1, that is the zoom position of the image pickup lens system 5 is at the tele-end, respectively.

Referring to these figures, the low-pass filter effect by the phenomenon of diffraction is explained.

In FIGS. 3A and 3B, A denotes an aperture stop of the diaphragm unit 3. If the aperture stop A is reduced to more than a certain extent, the aberration of the image pickup lens system 5 becomes negligibly small, so that characteristics of the image pickup lens system 5 are governed by the phenomenon of diffraction at the aperture stop. With the circular aperture stop shape, the optical transfer function (OTF), representing the characteristics of the image pickup lens system 5, may be represented by the following equation (3):

$$OTF_{lens}\{\lambda(r)\}=1/\pi\ (2\Theta-\sin 2\Theta)\}\cos\Theta=\lambda Fr \qquad (3)$$

on the optical axis within the image plane, if the above-mentioned aberration is neglected. In the above equation, $\lambda$, F and r denote the light wavelength, the F-number of the image pickup lens system and the spatial frequency, respectively.

The equation (3) holds for the monochromatic light having a certain wavelength $\lambda$. However, since the usual image pickup lens system handles the visible range as the wavelength of light $\lambda$, it is necessary to find the OTF for the white light which is the OTF representing comprehensive characteristics for the visible range.

With the spectral transmission factor of the image pickup lens system of $T(\lambda)$ and sensitivity characteristics of the CCD solid-state image pickup device of $S(\lambda)$, the OTF for the white light may be found by integrating the left side of the equation (3) multiplied by a weight $W(\lambda)=T(\lambda)\ S(\lambda)$ for the visible range with respect to the wavelength in accordance with the following equation (4):

$$OTF_{lens}(r)=\int W(\lambda)OTF_{lens}\{\lambda(r)\}d\lambda \qquad (4)$$

The integration shown by the equation (4) may be usually approximated by five wavelengths. If g, F, e, d or C are selected as the wavelengths, by way of an example, the OTF for the white light may be represented by the equation (5):

$$OTF_{lens}(r) = \frac{Wg \cdot OTF_{lens}\{g(r)\} + WF \cdot OTF_{lens}\{F(r)\} + We \cdot OTF_{lens}\{e(r)\} + Ed \cdot OTF_{lens}\{d(r)\} + WC \cdot OTF_{lens}\{C(r)\}}{OTF_{lens}\{g(r)\} + OTF_{lens}\{F(r)\} + OTF_{lens}\{e(r)\} + OTF_{lens}\{d(r)\} + OTF_{lens}\{C(r)\}} \qquad (5)$$

Figure 4:
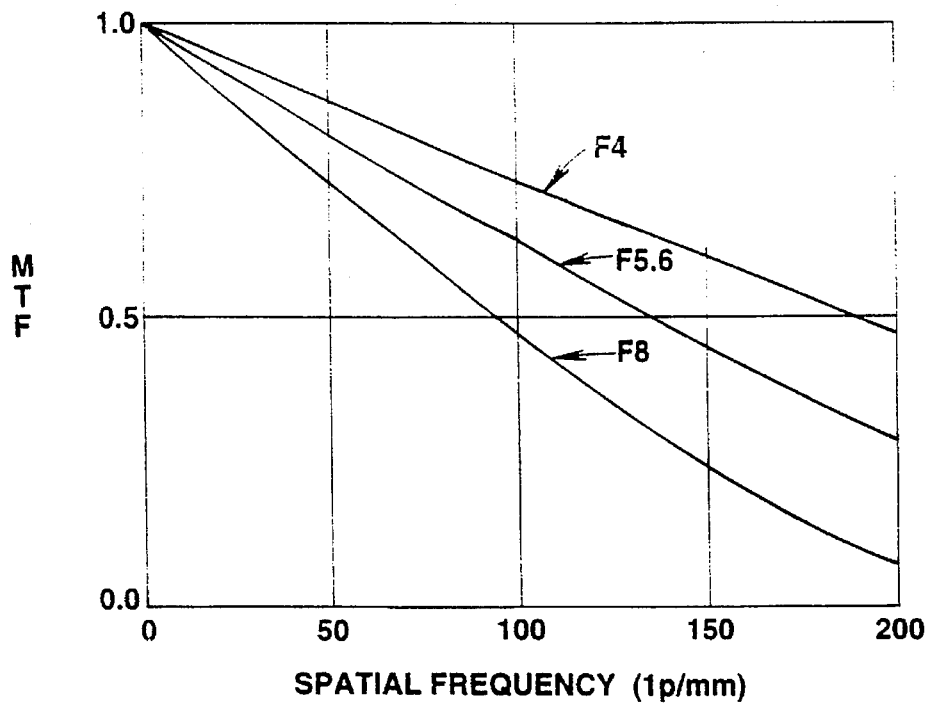
FIG. 4 is a graph showing MTF—spatial frequency characteristics of the white light for a case wherein the diaphragm aperture shape in the diaphragm device in the first embodiment is circular.

FIG. 4 shows the modulation transfer function (MTF) for the circular diaphragm stop shape, as calculated on the basis of the above equation (5). The MTF is defined as the absolute value of the OTF. The weights for the respective rays were found from $T(\lambda)$ and $S(\lambda)$ of the equation (4), and the following parameters were employed.

Wg=0.099, WF=0.222, We=0.406, Wd=0.231, WC=0.042

It is seen from FIG. 4 that the MTF is lowered with increase in the F-number from F4 to F8 through F5 and F6, and that the lowering of the MTF is particularly outstanding for the higher spatial frequencies. Since the optical low-pass filter is employed for lowering the MTF of the higher spatial frequencies, the phenomenon of diffraction is useful for the optical low-pass filter.

For comparison, FIG. 1 shows the characteristics of the conventional optical low-pass filter employing three quartz plates as proposed in JP Patent Kokai publication No. 57-89683 (1982). The conventional optical low-pass filter shown in FIG. 1 is designed for the CCD solid-state image pickup device having the pixel pitch PH along the direction of the horizontal scanning lines equal to PH=0.00835 mm with the cut-off frequency $r_c$ being $r_c$=80 [lp/mm] approximately equal to the Nyquist frequency shown by the equation (8):

Nyquist frequency=1/2PH=79 [lp/mm]  (6)

In the above equation, the unit [lp/mm] indicates the unit of the spatial frequency, that is the number of pairs of white and black lines per mm.

Figure 2:
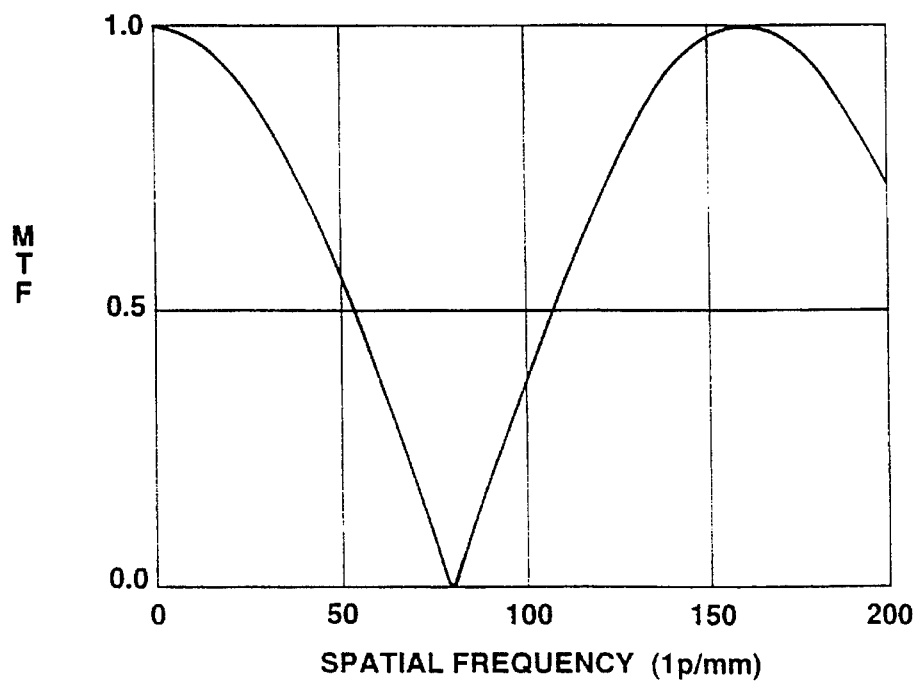
FIG. 2 is a graph showing MTF—spatial frequency characteristics of a conventional optical low-pass filter employing a sole quartz plate.
Figure 5:
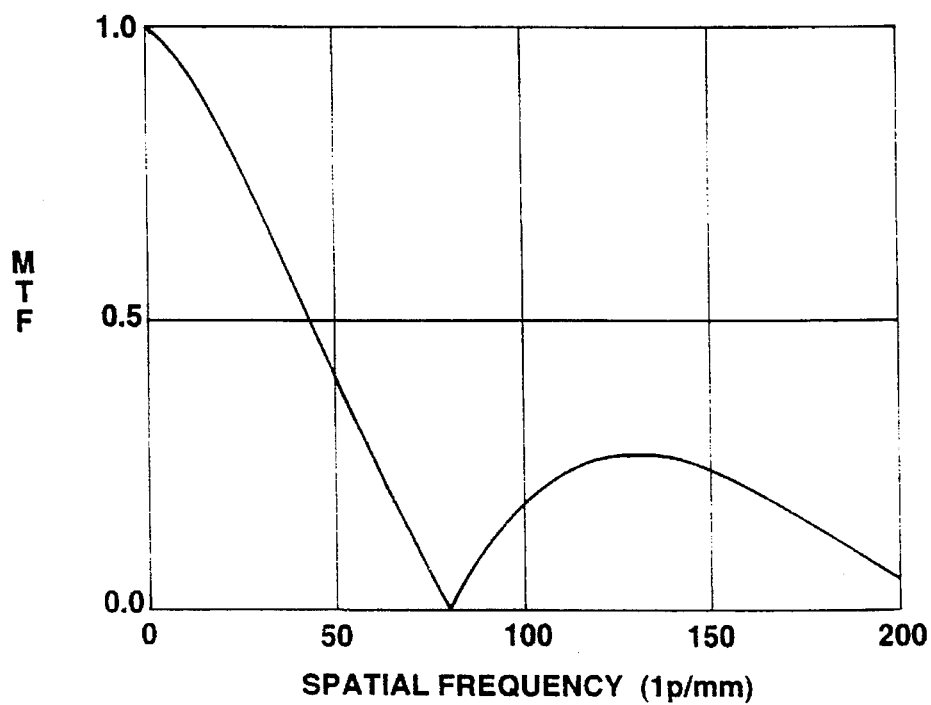
FIG. 5 is a graph showing MTF—spatial frequency characteristics for a case wherein an optical low-pass filter employing a sole quartz plate is combined with an image pickup lens system 5 in which a diaphragm is set to an F-number equal to 8 (F 8).

FIG. 2 shows characteristics of an optical low-pass filter employing a sole quartz plate (double refraction plate) having the same cut-off frequency $r_c$. From comparison with the characteristics of the optical low-pass filter employing three quartz plates (double refraction plates), it is seen that the MTF at the spatial frequencies higher than the cut-off frequency $r_c$ has larger values such that suppression of spurious signals is unsatisfactory. FIG. 5 shows the MTF—spatial frequency characteristics for a case wherein the optical low-pass filter employing the sole quartz plate shown in FIG. 2 is combined with the image pickup lens system 5 which is shown by the MTF—spatial frequency characteristics shown in FIG. 4 and which has its diaphragm reduced to FS.

It is seen from FIG. 5 that the MTF values at the spatial frequencies higher than the cut-off frequency ($r_c$=80 [lp/mm]) are lowered by the above-mentioned phenomenon of diffraction so that the spurious signal suppressive effects substantially equal to those achieved by the conventional optical low-pass filter employing three quartz plates shown in FIG. 1 may be achieved. For suppressing the spurious signals, it is necessary for the MTF for not lower than the cut-off frequency $r_c$ to satisfy the condition shown in the equation (7):

MTF(r)≦0.4  (7)

that is the condition in which spurious signals are reduced to one-half or less.

The MTF in the equation (7) is an absolute value of the OTF of the white light defined by the equation (4) or the equation (5) similar to the equation (4).

The MTF of the optical low-pass filter employing the sole quartz plate has the maximum value of 1.0 at the spatial frequency $2r_c$, such as $2r_c$=160 [lp/mm], as shown in FIG. 2. Consequently, if, when the image pickup lens system 5 is combined with the sole quartz plate, the MTF at the spatial frequency $2r_c$ satisfies the following equation (8):

MTF ($2r_c$)≦0.4  (8)

the above equation (7) is substantially satisfied even at the higher frequency not lower than the cut-off frequency $r_c$, so that the value of MTF($2r_c$) represents a measure of the spurious signal suppressive effects.

From the equation (8), the following equation (9):

$MTF(2r_c)=MTF_{lens}(2r_c) \cdot MTF_{crys}(2r_c)=MTF_{lens}(2r_c) \leq 0.4$  (9)

is derived. Thus, in the image pickup lens system, comprising a combination of the image pickup lens system 5 and the sole quartz plate, it is mandatory that MTF($2r_c$) be smaller than 0.4. Meanwhile, $MTF_{crys}(2r_c)$=1 is used in the equation (9).

The F-number of the image pickup lens system 5 satisfying the following equation (10):

$MTF_{lens}(2r_c)$=0.4  (10)

is defined as being a reference value Fd.

It should be noted that the $MTF_{lens}$ represents the MTF on the optical axis within the image-forming plane in case the aberration of the image pickup lens system 5 is disregarded and only the diffraction at the diaphragm aperture in the diaphragm device 3 is taken into consideration.

It is seen from FIG. 4 that the larger the F-number becomes, the smaller $MTF_{lens}(2r_c)$ becomes, so that, if the F-number is larger than the reference value Fd, $MTF_{lens}(2r_c)$ becomes smaller than 0.4.

It will be seen from above that, in a region of the F-number larger than the reference value Fd, spurious signal suppressive effects sufficient as the low-pass filter can be produced on the basis of the diffraction proper to the image pickup lens system 5 and double refraction proper to the sole quartz plate without the necessity of employing three quartz plates.

The case in which the F-number is smaller than the reference value Fd, that is the case in which the F-number is in a range from the diaphragm open up to the reference value Fd, is hereinafter explained.

If the F-number becomes smaller than the reference value Fd, $MTF_{lens}(2r_c)$ becomes larger than 0.4, such that the spurious signal suppressive effects become lower. Consequently, an aspherical surface is introduced into the lens element in the image pickup lens system 5 for this region so that spherical aberration is positively introduced by the aspherical surface and hence the MTF for the high spatial frequency meets the equation (8).

A concrete embodiment in which the above-mentioned aspherical surface is set at the 12th surface in the image pickup lens system 5 is shown in FIG. 3. The 13th and 16th surfaces represent usual aspherical surfaces for correcting the aberration. The illustrative values shown in the following Table 1 are those at the wide-end.

TABLE 1

| | r (radius of curvature) | d (spacing above axis) | n (refractive index for d-ray) | ν (Abbe number) |
|---|---|---|---|---|
| 1 | 30.7910 | 1.000 | 1.84666 | 23.78 |
| 2 | 17.1510 | 4.110 | 1.69680 | 55.46 |
| 3 | 104.8650 | .150 | 1.00000 | .00 |
| 4 | 19.1290 | 3.010 | 1.69680 | 55.46 |
| 5 | 60.9270 | 1.120 | 1.00000 | .00 |
| 6 | 72.4160 | .900 | 1.83400 | 37.34 |
| 7 | 5.5490 | 3.240 | 1.00000 | .00 |
| 8 | −11.0570 | .700 | 1.68544 | 50.85 |
| 9 | 7.2870 | 2.290 | 1.84666 | 23.78 |
| 10 | −245.3400 | 14.634 | 1.00000 | .00 |
| 11 | ∞ | .700 | 1.00000 | .00 |
| 12 | 14.3000 | 3.440 | 1.58913 | 61.25 |
| 13 | −52.8570 | 5.814 | 1.00000 | .00 |
| 14 | 21.4670 | 1.100 | 1.84666 | 23.78 |
| 15 | 7.5000 | 4.910 | 1.69350 | 53.54 |
| 16 | −20.2640 | 7.692 | 1.00000 | .00 |
| 17 | ∞ | 3.380 | 1.51680 | 64.20 |
| 18 | ∞ | | 1.00000 | .00 |

The values at the tele-end are the same as those at the wide-end, except the following spacings:

$d_5=14.453$ $d_{10}=1.301$ $d_{13}=5.827$ $d_{16}=7.679$

The aspherical coefficients of the aspherical surfaces, that is the 12th, 13th and 16th surfaces, are as shown in the following Table 2:

TABLE 2

| 12th surface | $A_3 = -0.17131 \times 10^{-2}$ |
|---|---|
| | $A_4 = 0.22653 \times 10^{-2}$ |
| | $A_5 = -0.12308 \times 10^{-2}$ |
| | $A_6 = 0.34324 \times 10^{-3}$ |
| | $A_7 = -0.50296 \times 10^{-4}$ |
| | $A_8 = 0.32665 \times 10^{-5}$ |
| | $A_{10} = -0.69630 \times 10^{-8}$ |
| 13th surface | $A_4 = 0.11425 \times 10^{-3}$ |
| | $A_6 = 0.81273 \times 10^{-6}$ |
| | $A_8 = -0.20774 \times 10^{-7}$ |
| | $A_{10} = 0.18080 \times 10^{-9}$ |
| 16th surface | $A_4 = 0.63806 \times 10^{-4}$ |
| | $A_6 = -0.11189 \times 10^{-5}$ |
| | $A_8 = 0.13882 \times 10^{-7}$ |
| | $A_{10} = 0.23895 \times 10^{-10}$ |

It is noted that the aspherical shape of the aspherical surfaces, that is the 12th, 13th and 16th surfaces, are defined by the following equation (11):

$$Z = \frac{\rho^2/r}{1+\{1-(\rho/r)^2\}^{1/2}} + \sum_i A_i \rho^i \qquad (11)$$

in which $\rho$, $r$ and $A_i$ indicate the height in a direction normal to the optical axis, paraxial radius of curvature and the first-order aspherical coefficient, respectively, the optical axis being the Z-axis with the image plane side being a positive side and a point of intersection of the Z axis with the apex of each lens being a point of origin.

Figure 6:
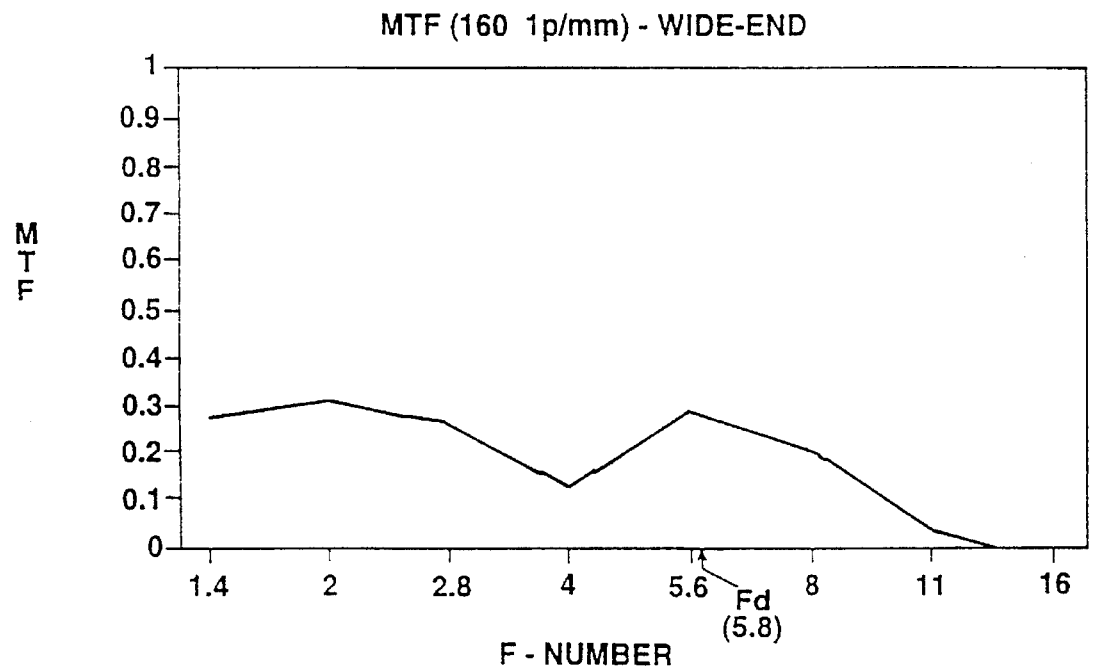
FIG. 6 is a graph showing the F-number dependency of MTF at a wide-end of an image pickup optical system according to the first embodiment (spatial frequency $2\lambda_c=$ 160 [lp/mm].
Figure 7:
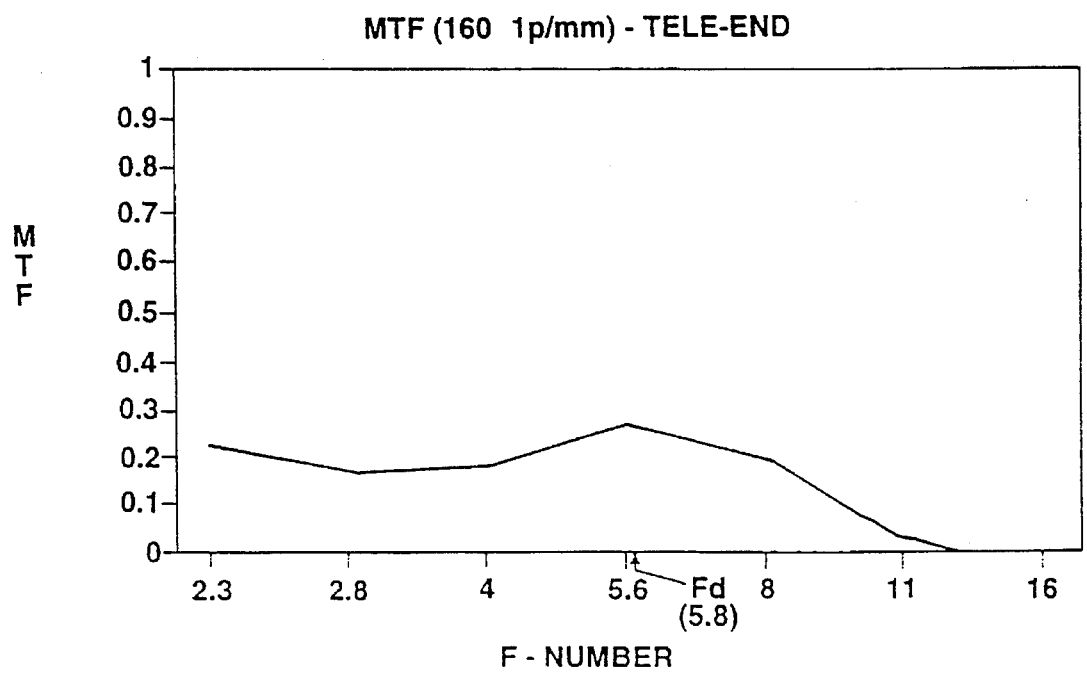
FIG. 7 is a graph showing the F-number dependency of MTF at a tele-end of the image pickup optical system according to the first embodiment (spatial frequency $2\lambda_c=$ 160 [lp/mm].

In FIGS. 6 and 7, the F-number dependency of the MTF at the wide-end (spatial frequency $2r_c=160$ [lp/mm]) and the F-number dependency of the MTF at the tele-end (spatial frequency $2r_c= 160$ [lp/mm]) are shown. The values shown in these figures represent the values on the optical axis in the image pickup lens system 5 for the case in which the image pickup lens system 5 is combined with a sole quartz plate. It is seen that the equation (8) is met with the values shown in these figures.

Figure 8:
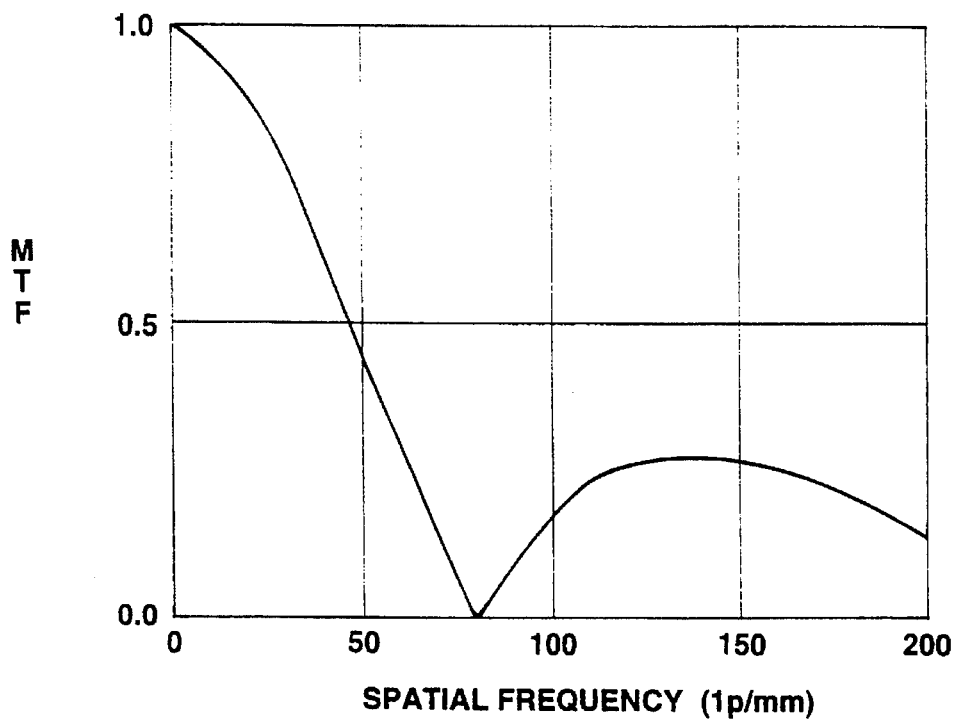
FIG. 8 is a graph showing MTF—spatial frequency characteristics for a case wherein a sole quartz plate is combined with an image pickup lens system with F 2.8 at the wide-end of the image pickup system according to the first embodiment.
Figure 9:
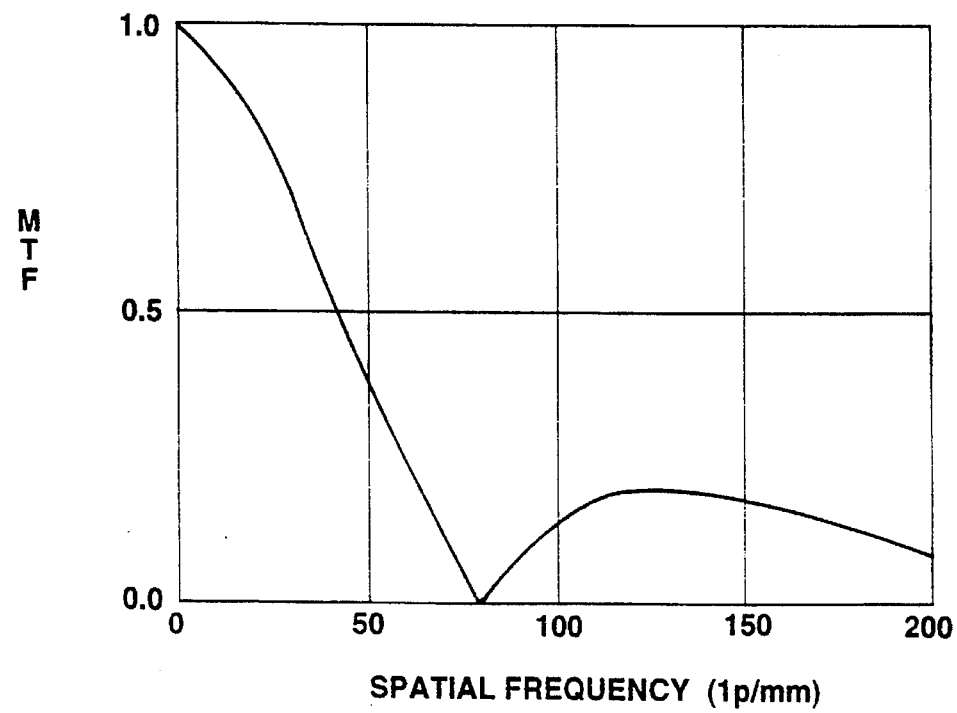
FIG. 9 is a graph showing MTF—spatial frequency characteristics for a case wherein a sole quartz plate is combined with an image pickup lens system with F 2.8 at the tele-end of the image pickup system according to the first embodiment.

FIGS. 8 and 9 show the MTF—spatial frequency characteristics for the case in which a sole quartz plate is combined with the F-2.8 image pickup lens system at the wide-ends and tele-ends, respectively. It is seen from the characteristics shown in FIGS. 8 and 9 that the equation (7) is met in the high spatial frequency region of not less than the cut-off frequency $r_c$.

Figure 10:
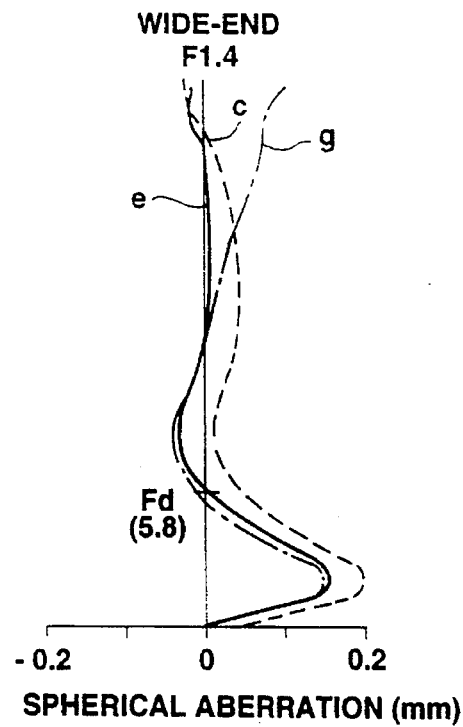
FIG. 10 is a graph showing spherical aberration of the image pickup lens system at the wide-end of the image pickup system according to the first embodiment.
Figure 11:
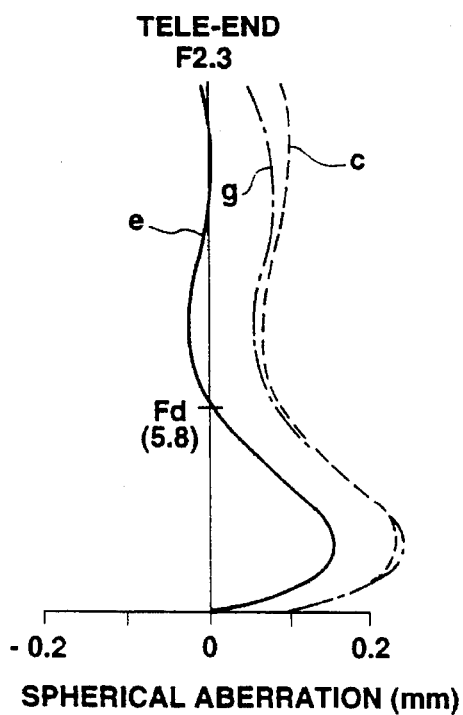
FIG. 11 is a graph showing spherical aberration of the image pickup lens system at the tele-end of the image pickup system according to the first embodiment.
Figure 12:
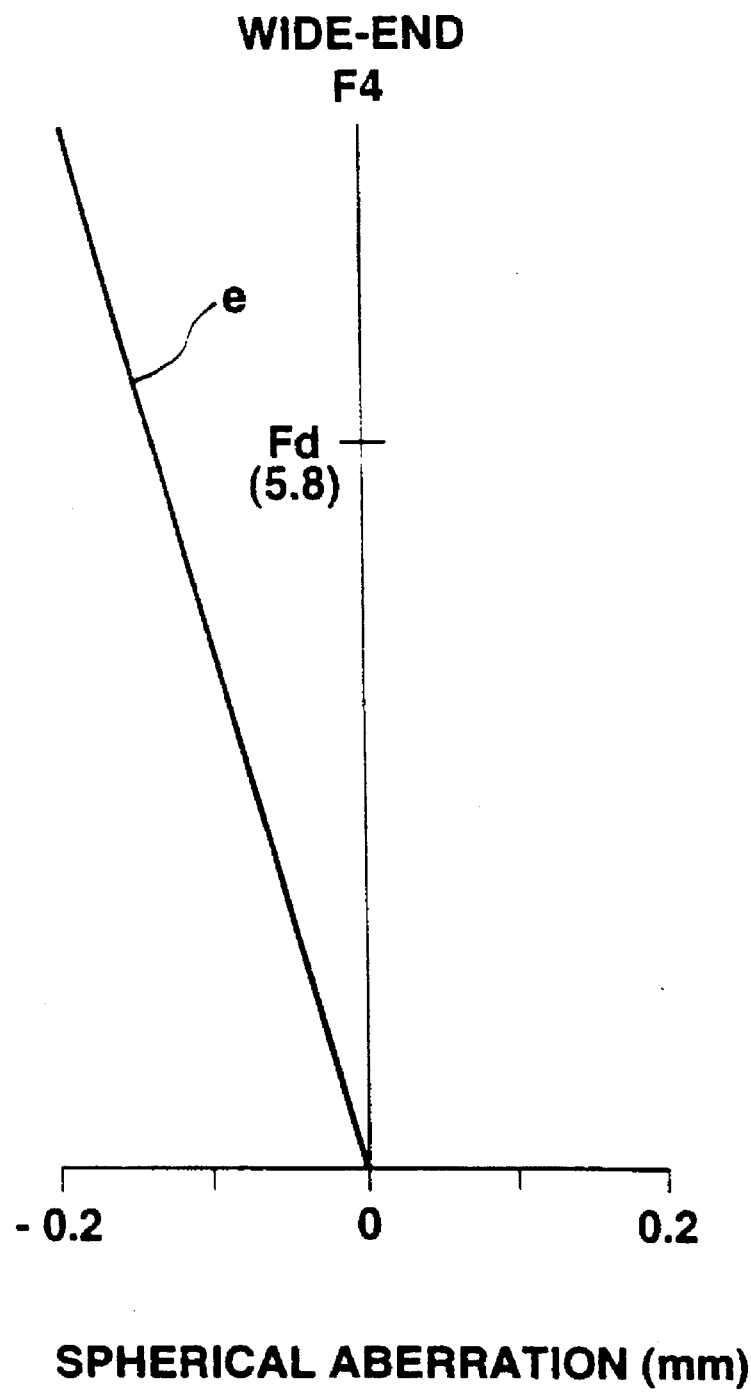
FIG. 12 is a graph showing the spherical aberration of the image pickup lens system for a case wherein the spherical aberration has no extreme values in an F number area larger than a reference value Fd, with the spherical aberration increasing or decreasing monotonously.

FIGS. 10 and 11 show spherical aberration of the image pickup lens system 5 at the wide-end and at the tele-end, respectively. In these figures, the ordinate stands for the F-number.

If attention is directed to an e-ray, having a wavelength which is substantially the center wavelength of the visible light range, the spherical aberration necessarily has an extreme value in a region of the F-number larger than the reference value Fd. If the spherical aberration has no extreme value in this region, with the spherical aberration increasing or decreasing monotonously, the MTF is lowered only insignificantly, although the image-forming position along the optical axis is changed. If MTF is forced to be lowered significantly, the deviation of the image plane from the paraxial image plane becomes significant so that movement of the image-forming position caused by changes in the diaphragm poses a serious problem.

If, for example, the spherical aberration of the e-ray is decreased monotonously at the wide-end up to F4, with $MTF(r_c/2)$ at F4 being 0.24, the image plane at which MTF ($r_c/2=40$ [lp/mm]) becomes maximum is spaced from the paraxial image plane by $-0.155$ mm, which is significantly larger than $-0.01$ mm for the case of F4 shown in FIG. 10. It is therefore critical that the spherical aberration of the image pickup lens system 5, and that of e-ray as representative of the aberration, has at least one extreme value in the region of the F-number larger than its reference value Fd.

Besides the suppression of the spurious signals, picture contrast is critical as the characteristic of the optical low-pass filter. The MTF—spatial frequency characteristics up to the cut-off frequency $r_c$ contributes to the picture contrast. While the value of MTF ($2r_c$) is used as a measure for the spurious signal suppressive effects, the value of MTF ($r_c/2$) is to be used as a measure for the picture contrast. In the present embodiment, $r_c/2=40$ [lp/mm].

Figure 13:
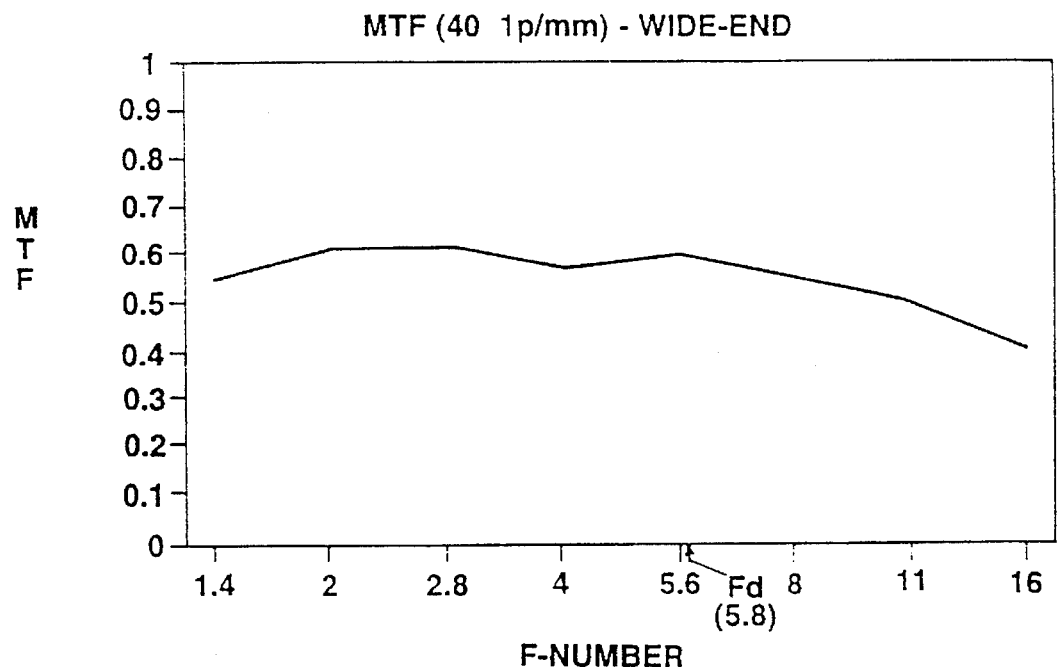
FIG. 13 is a graph showing the F-number dependency of MTF at a wide-end of an image pickup optical system according to the first embodiment (spatial frequency $2\lambda_c=40$ [lp/mm].
Figure 14:
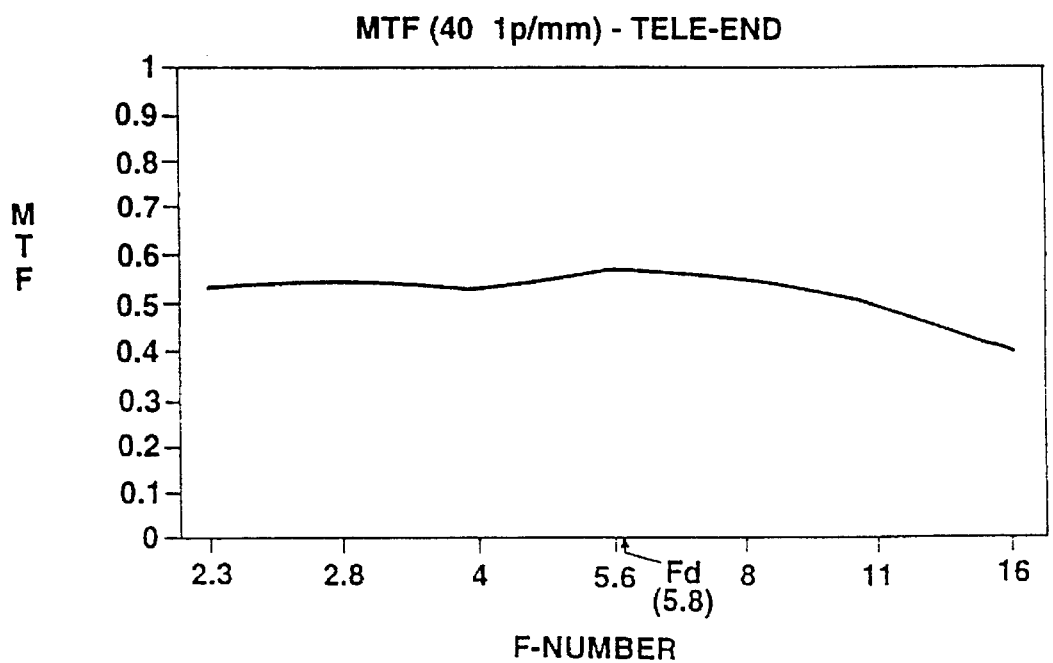
FIG. 14 is a graph showing the F-number dependency of MTF at a tele-end of an image pickup optical system according to the first embodiment (spatial frequency $2\lambda_c=40$ [lp/mm].

FIGS. 13 and 14 show the F-number dependency of the MTF (spatial frequency $r_c/2=40$ [lp/mm]) at the wide-end and at the tele-end, respectively. These MTF values are the values on the optical axis in the image plane when the image pickup lens system 5 is combined with a sole quartz plate. It is seen that the F-number has a substantially constant value in the range of the F-number from diaphragm open up to the reference value Fd.

If the maximum and minimum values of MTF ($r_c/2$) from diaphragm open up to the reference value Fd are $MTF_{MAX}(r_c/2)$ and $MTF_{MIN}(r_c/2)$, respectively, a picture having substantially constant picture contrast for the F-number from diaphragm open up to the reference value Fd may be produced if the following equation (12):

$$\frac{MTF_{MAX}(r_c/2) - MTF_{MIN}(r_c/2)}{MTF_{MAX}(r_c/2)} \leq 0.3 \qquad (12)$$

is satisfied.

In the present embodiment, the value of the left side of the equation (12) is 0.12 and 0.08 at the wide-end and at the tele-end, respectively, so that the condition of the equation (12) is met.

On the other hand, if the F-number becomes larger than the reference value Fd, MTF ($r_c/2$) is lowered due to the phenomenon of diffraction at the aperture in the diaphragm device 3. The manner of decrease of MTF ($r_c/2$) is shown for example in FIG. 13. If the value at F16 is substituted into $MTF_{MIN}(r_c/2)$ of the equation (10), the value of the left side of the equation (12) becomes equal to 0.34, thus exceeding 0.3. Thus it becomes critical not to reduce the aperture stop by the diaphragm device 3 substantially to F11 or more.

Deterioration in MTF due to the phenomenon of diffraction is produced in the lens system for the usual image pickup camera. Thus the volume of the incident light is diminished by a neutral density filter (ND filter) for an extremely light object for limiting the aperture stop so that a certain F-number is not exceeded. In the present embodiment, limitation may be placed on the F-number by providing the ND filter or the like so that the equation (12) will be met for the region of use, herein the range of the F-number from diaphragm open up to substantially F11.

Figure 15:
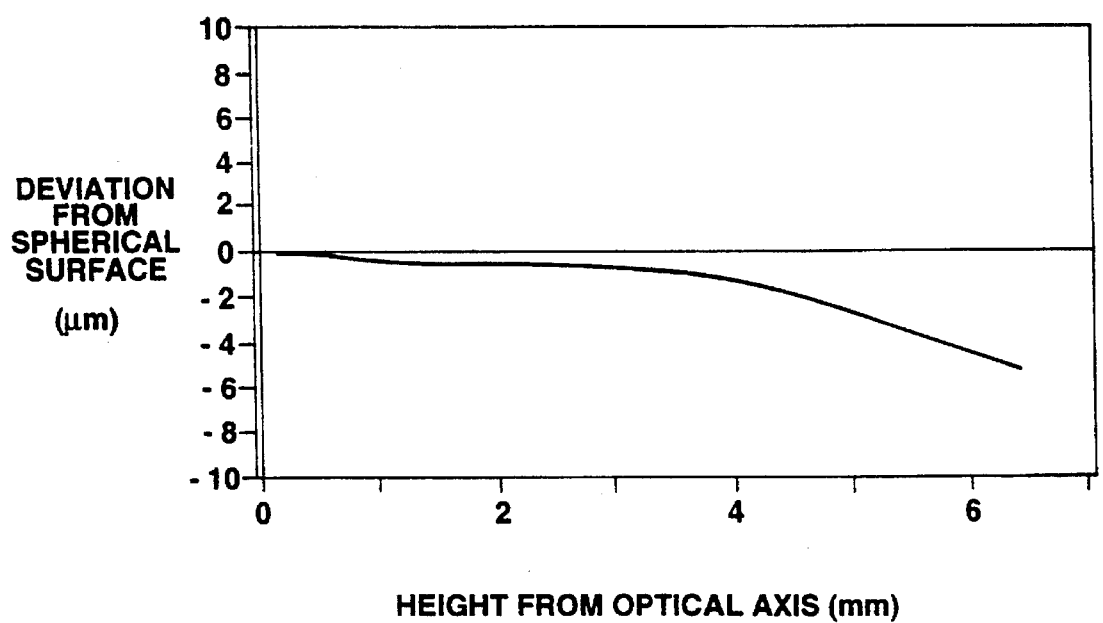
FIG. 15 is a graph showing the deviation from the spherical surface of the 12th aspherical surface having the low-pass filter effects.
Figure 16:
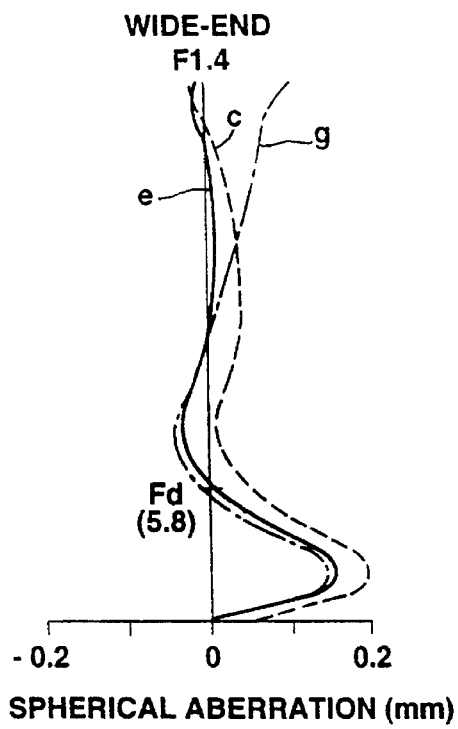
FIG. 16 is a graph showing spherical aberration at the wide-end of the image pickup system according to the second embodiment.
Figure 17:
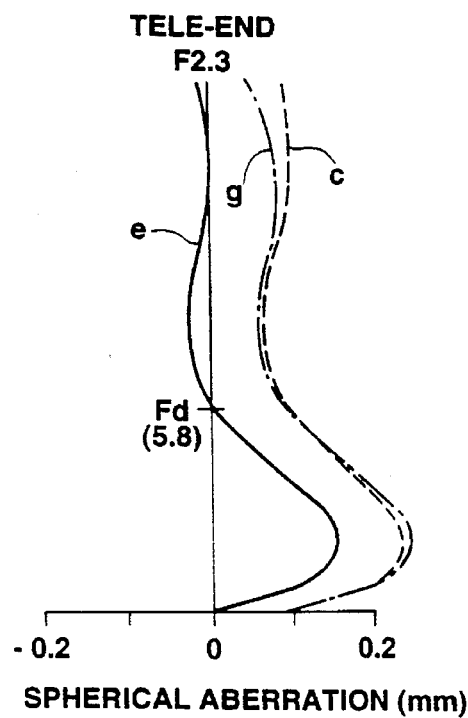
FIG. 17 is a graph showing spherical aberration at the tele-end of the image pickup system according to the second embodiment.

FIG. 15 shows the deviation from the spherical surface of the aspherical 12th surface to which is accorded the low-pass filtering effect. The aspherical lens may be manufactured by e.g. glass molding using a suitable mold.

The constitution of the present embodiment may be summarized as follows:

(a) for F-number≧Fd:

The diffractive action by the aperture of the diaphragm unit 3 in the image pickup lens system 5 and the birefringent action by the sole quartz plate are combined together.

(b) for F-number≧Fd:

The aberration by the aspherical surface in the image pickup lens system 5 and the birefringent action by the sole quartz plate are combined together. It is necessary for the spherical aberration relative to the e-ray to have at least one extreme value in an F-number region larger than the reference value Fd.

The above constitution gives a practically satisfactory optical low-pass filter having sufficient spurious signal suppressive effects by meeting the equation (8) and by suffering from lesser changes in contrast by the F-number by satisfying the equation (12). The above description has been directed to the performance of the low-pass filter on the optical axis within the image plane. In general, the aberration of the image pickup lens system 5 off the optical axis is larger than that on the optical axis, such that the high spatial frequency components of MTF are lowered more outstandingly. The diffractive action off the optical axis is substantially the same as that on the optical axis.

Consequently, if sufficient spurious signal suppressive effects can be produced on the optical axis, spurious signal suppressive effects equivalent or superior to those on the optical axis can be expected off the optical axis. For this reason, the MTF value on the optical axis is handled as representative values of the characteristics of the optical low-pass filter. Although the shape of the diaphragm aperture is herein assumed to be circular, the above substantially applies to any other shape of the diaphragm aperture, if the F-number is defined as follows:

That is, if the focal length of the image pickup lens system 5 is f, the F-number may be defined for the circular diaphragm aperture shape by the following equation (13):

$$F=f/D \quad (13)$$

where D is the diameter of an entrance pupil.

For any other diaphragm aperture shape, the F-number may be defined by the following equation (14):

$$F=f/D' \quad (14)$$

where D' is the width of the entrance pupil of the sole quartz plate relative to the direction of separation of the light beam.

The width of the quartz plate along the direction of separation of the light beam is selected as D' for the purpose of combining the characteristics of the quartz plate with those of the image pickup lens system 5. The direction of horizontal scanning lines particularly prone to spurious signals is usually selected for this direction. The double refraction plate may also be calcite in place of the quartz plate.

An image pickup optical system according to a second embodiment is explained. In the first embodiment, the 12th surface, which is inherently a spherical surface, is set as the aspherical surface for according low-pass filter characteristics for the region of the F-number less than Fd. However, the low-pass filter characteristics may also be accorded to a surface which is inherently an aspherical surface for compensating the aberration, if its aspherical coefficients are changed.

That is, the aspherical surface may be used not only for correcting the aberration but as a low-pass filter. Table 3 shows illustrative numerical values for this case by way of the second embodiment. Since the present second embodiment is identical with the first embodiment except that (i) the 12th surface is an aspherical surface, and (ii) the aspherical coefficients of the 13th surface shown in Table 3 differ from those of the first embodiment, the numerical values in common with the first embodiment are not shown for brevity. It is noted that the 13th surface is the aspherical surface which is employed for correcting the aberration and as a low-pass filter simultaneously.

TABLE 3

| 13th surface | $A_3 = 0.17707 \times 10^{-2}$ |
| --- | --- |
| | $A_4 = -0.22532 \times 10^{-2}$ |
| | $A_5 = 0.13008 \times 10^{-2}$ |
| | $A_6 = -0.36614 \times 10^{-3}$ |
| | $A_7 = 0.54404 \times 10^{-4}$ |
| | $A_8 = -0.35966 \times 10^{-5}$ |
| | $A_{10} = 0.79921 \times 10^{-8}$ |

Meanwhile, the low-pass filter effects by the diffraction for the F-number>Fd is basically the same as those for the first embodiment, because modifications are required for only the above-mentioned two items. This may be substantiated by the following.

That is, as regards the spherical aberration at the wide-end and at the tele-end of the image pickup lens system 5 according to the second embodiment, the spherical aberration of the e-ray has extreme values for the F-numbers not less than the reference value Fd for both the wide-end and the tele-end.

Figure 18:
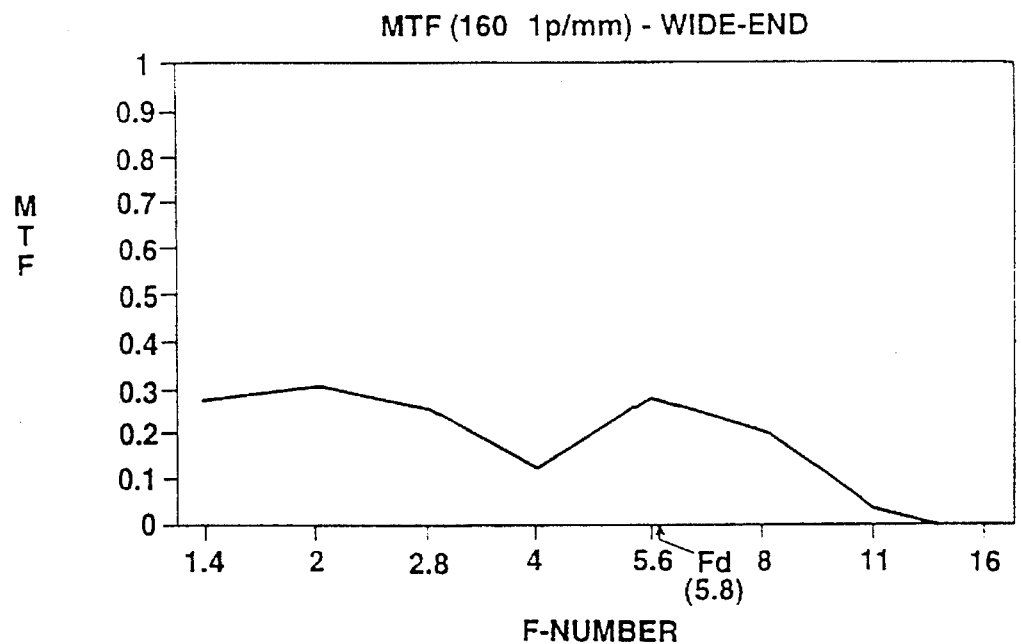
FIG. 18 is a graph showing the F-number dependency of MTF at a wide-end of an image pickup optical system according to the second embodiment (spatial frequency $2\lambda_c=160$ [lp/mm].
Figure 19:
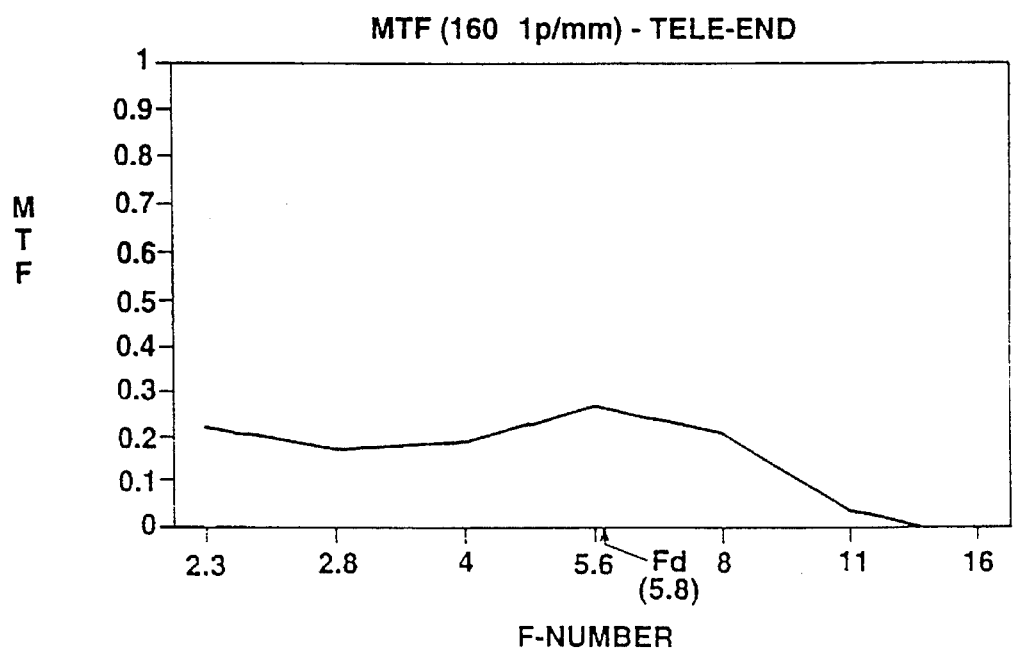
FIG. 19 is a graph showing the F-number dependency of MTF at a tele-end of an image pickup optical system according to the second embodiment (spatial frequency $2\lambda_c=160$ [lp/mm].

Besides, as regards changes of the MTF at the wide-end (spatial frequency $2r_c=180$ [lp/mm]) and at the tele-end (spatial frequency $2r_c=180$ [lp/mm]) relative to the F-number of the image pickup lens system 5 according to the second embodiment, these changes in MTF satisfy the condition of the equation (8) for all values of the F-number, as shown in FIGS. 18 and 19.

Figure 20:
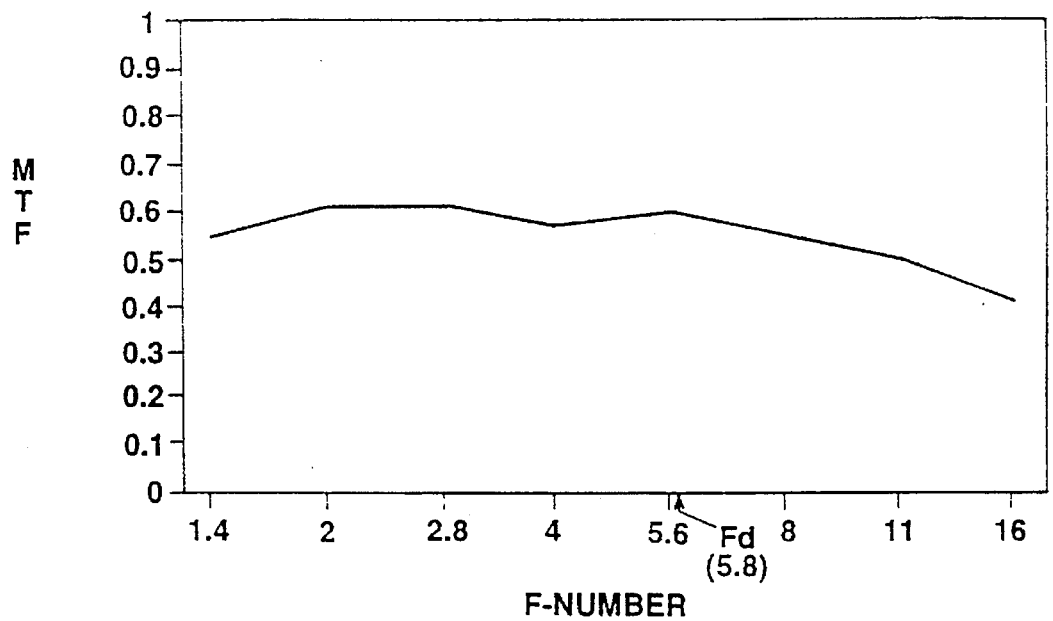
FIG. 20 is a graph showing the F-number dependency of MTF at a wide-end of an image pickup optical system according to the second embodiment (spatial frequency $2\lambda_c=40$ [lp/mm].
Figure 21:
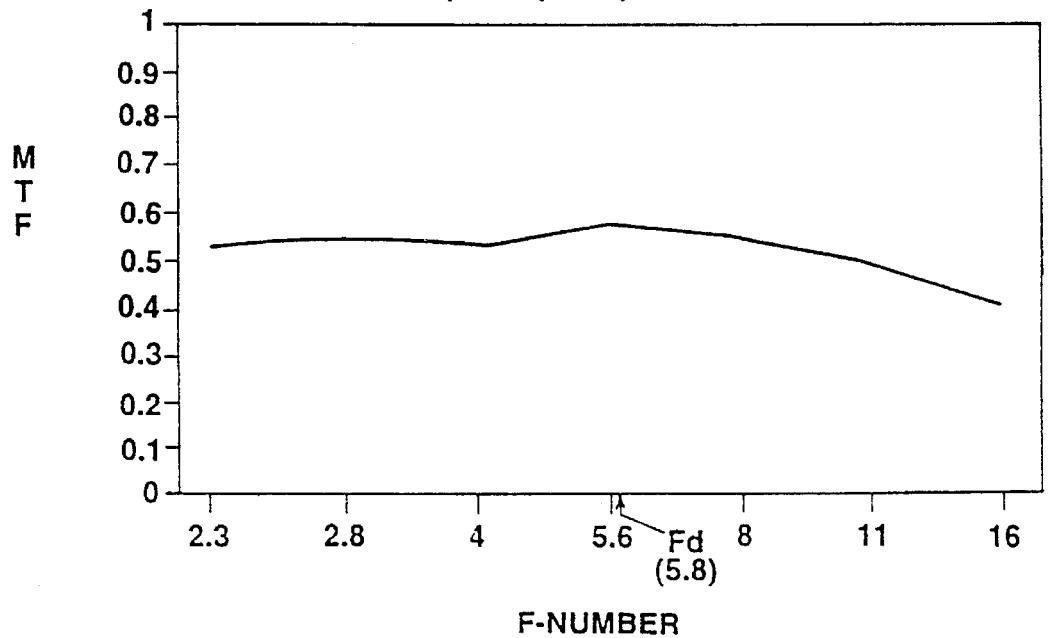
FIG. 21 is a graph showing the F-number dependency of MTF at a tele-end of an image pickup optical system according to the second embodiment (spatial frequency $2\lambda_c=40$ [lp/mm].

On the other hand, as regards changes of the MTF at the wide-end (spatial frequency $r_c/2=40$ [lp/mm]) and at the tele-end (spatial frequency $r_c/2=40$ [lp/mm]) relative to the F-number of the image pickup lens system 5 according to the second embodiment, these changes are 0.11 and 0.08 at the wide-end and at the tele-end, respectively, in the range of the F-number of less than Fd, thus satisfying the condition of the equation (12), as shown in FIGS. 20 and 21.

Figure 22:
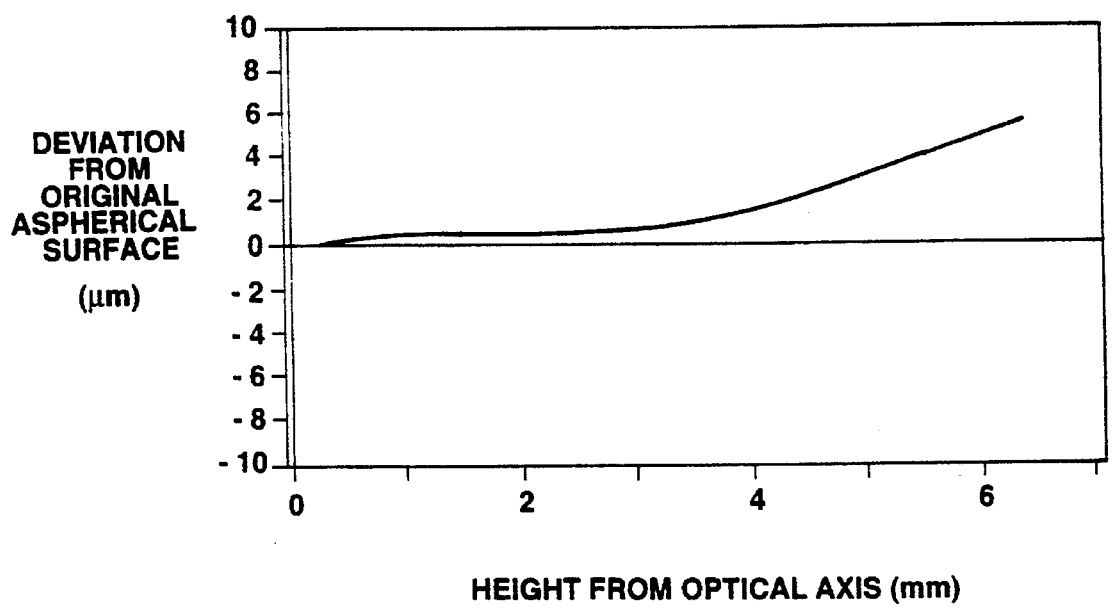
FIG. 22 is a graph showing the deviation of the 13th surface from the original aspherical surface (13th surface of the first embodiment).

It is seen from above that the image pickup optical system according to the second embodiment has an optical low-pass filter having characteristics substantially equivalent to those of the image pickup optical system according to the first embodiment. FIG. 22 shows the deviation of the 13th surface from the original aspherical surface (the 13th surface of the first embodiment). This aspherical surface may be produced by glass molding using a mold, as in the first embodiment.

As compared to the image pickup optical system according to the second embodiment, the image pickup optical system according to the second embodiment has its 12th surface as the spherical surface, so that the number of the aspherical surfaces is decreased by one. Consequently, the metal mold for the 12th surface may be a circular metal mold which may be produced easily and inexpensively. Besides, since the 12th and 13th surfaces of the lens of the first embodiment are non-spherical and hence both sides of the lens are non-spherical to produce centering difficulties. Conversely, the lens of the present second embodiment is aspherical on one side only so that centering may be facilitated as compared to the double aspherical side lens.

It will be seen from above that, in the image pickup optical system according to the first and second embodiments, the MTF at the spatial frequencies not lower than the cut-off frequency $r_c$ is lowered in the range of the F-number not lower than its reference value Fd by the combined effects of the diffraction by the aperture of the diaphragm device 3 and the birefringence of the sole double refraction plate, that is the optical low-pass filter function, whereas the MTF at the spatial frequencies not lower than the cut-off frequency $r_c$ is lowered in the range of the F-number not higher than its reference value Fd by the combined effects of the aberration by the aspherical surfaces of the 12th, 13th and 16th surfaces or the 13th and 16th surfaces and the birefringence of the sole double refraction plate.

Consequently, the spurious signal suppressive effects substantially the same as those of a conventional optical low-pass filter employing three quartz plates may be produced with only one quartz plate for reducing the number of the double refraction plates and production costs of the image pickup optical system. Since only one double refraction plate is employed, the production process involving troublesome operations, such as bonding, may be eliminated to improve mass-producibility of the image pickup optical system.

In particular, since the aspherical surfaces in the second embodiment are used simultaneously for correcting the aberration, with the 12th surface being designed as a spherical surface and with the 13th and 16th surfaces being designed as the aspherical surfaces, the number of the aspherical surfaces may be diminished on the whole, while production costs may be further reduced. The fact that the number of the aspherical surfaces is diminished occasionally means that the single aspherical side lens may be used in place of the double aspherical side lens, so that the production process may be simplified by facilitated optical axis matching.

Although the CCD solid-state image pickup device is used in the above-described first and second embodiments as the image pickup device, the present invention may also be applied to the case wherein an image tube is employed as the image pickup device.

What is claimed is:

1. An image pickup optical system having an image pickup lens system having a plurality of lenses arranged in multiple stages for forming an image of an object on an image plane of an image pickup device, said image pickup optical system comprising:

a double refraction plate arranged downstream of said image pickup lens system, first optical means for determining the F-number of said image pickup lens system by a diaphragm stop, said first optical means operating when the F-number is not less than a pre-set value in conjunction with said double refraction plate for lowering the modulation transfer function (MTF) for a range of the spatial frequency not less than the spatial frequency which is prone to spurious signals, second optical means operating when the F-number is not more than a pre-set value in conjunction with said double refraction plate for lowering the modulation transfer function (MTF) for a range of the spatial frequency not less than the spatial frequency which is prone to spurious signals, wherein the relation MTF($2r_c$) is an MTF value on the optical axis in the image plane when the image pickup lens system is combined with said double refraction plate, said MTF($2r_c$) being also an MTF value at a spatial frequency $2r_c$, $r_c$ being a cut-off frequency by the double refraction plate, wherein the relation $$\frac{MTF_{MAX}(r_c/2) - MTF_{MIN}(r_c/2)}{MTF_{MAX}(r_c/2)} \leq .3$$

is satisfied, wherein $MTF_{MAX}(r_c/2)$ and $MTF_{MIN}(r_c/2)$ are a maximum value and a minimum value, respectively, of the MTF at the spatial frequency $r_c/2$ when said aperture of said first optical means is changed from the fully opened diaphragm to said pre-set value of the F-number, and said pre-set value of the F-number being an MTF value which prevails when assumed that the image pickup lens system is free of aberration and only the diffraction at the aperture of the diaphragm in said first optical means contributes to MTF, said pre-set value of the F-number also being a value of the F-number which prevails when the value of the MTF for a spatial frequency $2r_c$ is 0.4, with $r_c$ being the cut-off frequency by the double refraction plate.

2. The image pickup optical system as claimed in claim 1 wherein the relation MTF($2r_c$) $\leq 0.4$ is satisfied for the totality of the values of the F-number in excess of the F-number value for complete opening of a diaphragm in said first optical means, said MTF($2r_c$) being an MTF value on the optical axis in the image plane when the image pickup lens system is combined with said double refraction plate, said MTF($2r_c$) being also an MTF value at a spatial frequency $2r_c$, $r_c$ being a cut-off frequency by the double refraction plate.

3. The image pickup optical system as claimed in claim 1 wherein a spherical aberration of said image pickup lens system for an e-ray has at least one extreme value for a region of the F-number larger than said pre-set value.

4. The image pickup optical system as claimed in claim 1 wherein aspherical surfaces in said second optical means is simultaneously used for correcting aberration.

5. An image pickup optical system having an image pickup lens system having a plurality of lenses arranged in multiple stages for forming an image of an object on an image plane of an image pickup device, said image pickup optical system comprising:

a double refraction plate arranged downstream of said image pickup lens system, first optical means for determining the F-number of said image pickup lens system by a diaphragm stop, said first optical means operating when the F-number is not less than a pre-set value in conjunction with said double refraction plate for lowering the modulation transfer function (MTF) for a range of the spatial frequency not less than the spatial frequency which is prone to spurious signals, second optical means operating when the F-number is not more than a pre-set value in conjunction with said double refraction plate for lowering the modulation transfer function (MTF) for a range of the spatial frequency not less than the spatial frequency which is prone to spurious signals, wherein the relation MTF($2r_c$)$\leq 0.4$ is satisfied for the totality of the values of the F-number in excess of the F-number value for complete opening of a diaphragm in said first optical means, said MTF($2r_c$) being an MTF value on the optical axis in the image plane when the image pickup lens system is combined with said double refraction plate, said MTF($2r_c$) being also an MTF value at a spatial frequency $2r_c$, $r_c$ being a cut-off frequency by the double refraction plate, wherein the relation $$\frac{MTF_{MAX}(r_C/2) - MTF_{MIN}(r_C/2)}{MTF_{MAX}(r_C/2)} \leq .3$$

is satisfied, wherein $MTF_{MAX}(r_c/2)$ and $MTF_{MIN}(r_c/2)$ are a maximum value and a minimum value, respectively, of the MTF at the spatial frequency $r_c/2$ when said aperture of said first optical means is changed from the fully opened diaphragm to said pre-set value of the F-number, and said pre-set value of the F-number being an MTF value which prevails when assumed that the image pickup lens system is free of aberration and only the diffraction at the aperture of the diaphragm in said first optical means contributes to MTF, said pre-set value of the F-number also being a value of the F-number which prevails when the value of the MTF for a spatial frequency $2r_c$ is 0.4, with $r_c$ being the cut-off frequency by the double refraction plate.

6. The image pickup optical system as claimed in claim 5, wherein a spherical aberration of said image pickup lens system for an e-ray has at least one extreme value for a region of the F-number larger than said pre-set value.

7. The image pickup optical system as claimed in claim 5 wherein the aspherical surface in said second optical means is simultaneously used for correcting the aberration.

\* \* \* \* \*